United States Patent [19]
Graiver et al.

[11] Patent Number: 5,817,714
[45] Date of Patent: Oct. 6, 1998

[54] METHODS FOR MAKING POLYDIORGANOSILOXANE MICROEMULSIONS

[75] Inventors: Daniel Graiver, Midland, Mich.; Osamu Tanaka, Ichi-hara, Japan

[73] Assignee: Dow Corning Corporation, Midland, Mich.

[21] Appl. No.: 990,262

[22] Filed: Dec. 11, 1992

Related U.S. Application Data

[63] Continuation of Ser. No. 439,751, Nov. 21, 1989, abandoned, which is a continuation of Ser. No. 128,250, Dec. 3, 1987, abandoned, which is a division of Ser. No. 809,090, Dec. 12, 1985, abandoned.

[51] Int. Cl.⁶ .............................. C08J 5/06; C08K 5/06; C08L 83/07
[52] U.S. Cl. ..................... 524/762; 524/837; 252/312; 252/314
[58] Field of Search .................... 252/312, 314; 524/837, 762

[56] References Cited

U.S. PATENT DOCUMENTS

| | | | |
|---|---|---|---|
| 2,755,194 | 7/1956 | Volkmann et al. | 106/285 |
| 2,891,920 | 6/1959 | Hyde et al. | 524/837 |
| 3,294,725 | 12/1966 | Findlay et al. | 524/837 |
| 3,433,780 | 3/1969 | Cekada et al. | 524/156 |
| 3,975,294 | 8/1976 | Dumoulin | 252/354 |
| 4,052,331 | 10/1977 | Dumoulin | 252/312 |
| 4,146,499 | 3/1979 | Rosano et al. | 252/186 |
| 4,228,054 | 10/1980 | Ona et al. | 428/391 X |
| 4,380,503 | 4/1983 | Koerner et al. | 252/314 |
| 4,472,291 | 9/1984 | Rosano | 252/186.28 |
| 4,529,758 | 7/1985 | Traver | 524/43 |
| 4,620,878 | 11/1986 | Gee | 106/287.15 |
| 4,784,665 | 11/1988 | Ona et al. | 252/312 X |
| 4,824,877 | 4/1989 | Glover et al. | 523/221 |
| 4,842,766 | 6/1989 | Blehm et al. | 252/312 X |
| 4,935,464 | 6/1990 | Ona et al. | 524/837 OR |
| 4,999,398 | 3/1991 | Graicer et al. | 524/837 OR |
| 5,106,900 | 4/1992 | Hellstern et al. | 524/859 OR |

OTHER PUBLICATIONS

Bey et al., "The Mechanisms of the Anionic Emulsion Polymerization of Permethylcyclosiloxanes", *Polym. Prepr., Amer. Chem. Soc., Div. polym. Chem.*, 11 (2),pp. 995–996, (1970).

Weyenberg et al., "Anionic Emulsion Polymerization of Siloxanes", *Polym. Prepr., Amer. Chem. Soc., Div. Polym. Chem.*, 7(2), pp. 562–568, (1966).

Milton J. Rosen, Surfactants and Interfacial Phenomena, (John Wiley & Sons, New York, 1978) p. 224.

Rosen, M.J., "Surfactants & Interfacial Phenomena", (John Wiley & Sons, N.Y. 1978) pp. 224–226.

*Primary Examiner*—Richard D. Lovering
*Assistant Examiner*—Daniel S. Metzmaier
*Attorney, Agent, or Firm*—Sharon K. Severance

[57] ABSTRACT

A novel method for making stable aqueous microemulsions of high molecular weight polydiorganosiloxanes which comprises sequentially adding at an effective rate a standard emulsion comprised of polydiorganosiloxane precursor, surfactant, and water to a polymerization catalyst medium while mixing to form a clear, stable aqueous microemulsion of polydiorganosiloxane.

15 Claims, No Drawings

METHODS FOR MAKING POLYDIORGANOSILOXANE MICROEMULSIONS

This is a continuation of application Ser. No. 07/439,751 filed on Nov. 21, 1989, now abandoned, which is a continuation of Ser. No. 07/128,250 filed on Dec. 3, 1987 now abandoned, which is a divisional of Ser. No. 06/809,090 filed on Dec. 12, 1985, now abandoned.

FIELD OF THE INVENTION

The present invention relates to stable aqueous microemulsions of polydiorganosiloxane of the oil-in-water type and methods for the preparation of the same. This novel method for preparing such microemulsions comprises sequentially adding an emulsion of polydiorganosiloxane precursor at a constant rate to an aqueous solution of polymerization catalyst and surfactant to form stable, clear aqueous microemulsions of high molecular weight polydiorganosiloxane.

BACKGROUND OF THE INVENTION

Emulsions are mixtures of at least two components which are substantially immiscible in each other, and a surfactant which lowers interfacial tension between the two phases. A microscopic view of aqueous emulsions reveals two phases, an oil phase and a water phase. Depending upon the proportion of each component, the emulsion can be characterized as an oil-in-water emulsion or a water-in-oil emulsion. The chief distinction between the two being which component, the oil or water phase, comprises the continuous portion of the emulsion. The noncontinuous phase is in the form of droplets in the other phase.

Standard emulsions are opaque like milk due to the particle sizes of the droplet phase, and the difference in refractive indices between the oil and aqueous phases. Standard emulsions of polydiorganosiloxane are used in the formation of protective coatings and release coatings, as masonry impregnants, anti-foaming agents, leather treatments, and emollients in cosmetic applications.

Methods for making standard aqueous emulsions of polydiorganosiloxanes are well known in the art and can be separated into two types—mechanical means and emulsion polymerization means. Mechanical means typically involve homogenizing a mixture of polydiorganosiloxane, surfactant, and water using milling machinery to obtain the desired droplet sizes. Mechanical methods have limitations. Since mechanical methods of formation require physical work, only polydiorganosiloxanes of limited viscosity can be used to make standard emulsions. In the case of high viscosity fluids and resins, the fluid or resin must be dissolved in a water immiscible solvent, which is then homogenized with the aqueous phase. Since emulsions are employed to avoid using the very solvents used to dissolve the fluids and resins, such methods are considered undesirable.

A mechanical method for making standard, opaque emulsions of polydiorganosiloxane is described in U.S. Pat. No. 2,755,194 issued to Volkmann, Feb. 7, 1955. The method involves mixing a surfactant with polydimethylsiloxane with a viscosity of 350 cs. at 25° C., adding a small amount of water to the mixture, mixing in a colloid mill, sequentially adding water and remilling until the desired amount of water is present in the emulsion. This method does not produce clear polydimethylsiloxane oil-in-water microemulsions.

Emulsion polymerization methods for making emulsions of high viscosity polymers involve starting with low viscosity polymer precursors, i.e., monomers, or reactive oligomers, which are immiscible in water, a surfactant to stabilize the polymer precursor droplet in water, and a water soluble polymerization catalyst. These components are added to water, the mixture is stirred and polymerization is allowed to advance until the reaction is complete or the desired degree of polymerization is reached and a standard emulsion of the polymer is formed.

An example of an emulsion polymerization is taught in U.S. Pat. No. 2,891,920 issued to Hyde et al., which shows a method for making aqueous emulsions of polydimethylsiloxane starting with precursor molecules of the polydimethylsiloxane. Standard emulsions of polyorganosiloxane and water have a number of shortcomings, particularly, their stability to remain emulsions with the passage of time, freeze-thaw cycling, and their milky, or opaque appearance.

Microemulsions are mixtures of oil and water where the particle size of the resulting droplets is small enough so the resulting mixture is clear. Because of their clarity microemulsions are distinguishable form standard, opaque emulsions. Microemulsions of polydiorganosiloxane and water offer a number of advantages over standard emulsions. The clarity of the mixtures is advantageous in cosmetic applications, and the reduced particle size of the droplets is advantageous where it is necessary to deposit particles in small pores, for instance, in leather treatment processes. Microemulsions are also more temperature, dilution, and formulation stable than standard emulsions.

Methods for making microemulsions of polydiorganosiloxane are known in the literature, however, the methods for making these have limitations that severely hamper their usefulness.

U.S. Pat. No. 3,433,780 issued to Cekada (Mar. 18, 1982) teaches a method for making colloidal suspensions of silsesquioxanes with the unit formula $RSiO_{3/2}$ where R is a hydrocarbon radical. Silsesquioxanes are materials with three Si—O bonds per silicon. Cekada's method results in particle sizes of 10 to 1000 A, silicone materials content of about 10%, and does not teach how to make polydiorganosiloxane microemulsions.

U.S. Pat. Nos. 3,975,294 and 4,052,331, both issued to Dumoulin, teach methods for making microemulsions comprised of polydimethylsiloxane, water, and a special mixture of emulsifying agents claimed in the earlier issued patent. Dumoulin mixes polydimethylsiloxane, water, and the special emulsifier, and then homogenizes the mixture. Since this is a mechanical means of making an emulsion, the siloxane oils used in the process are by necessity low molecular weight (the examples use oils with viscosities of no more that 585 cP, which have molecular weight of 10,000 to 20,000). Otherwise, Dumoulin shows that his emulsifier makes standard emulsions of higher molecular weight oils. The microemulsions of Dumoulin are undesirable in processes where deposition of polysiloxane is desired because of their high surfactant content, and their relatively low polydiorganosiloxane content. Also, Dumoulin teaches aqueous polydiorganosiloxane microemulsions using a specific surface active composition. Variation of his emulsifier composition produces standard opaque emulsions.

U.S. Pat. No. 3,975,294, issued to Rosano, Aug. 17, 1976, teaches a method for making microemulsions which comprises: choosing a surfactant which is slightly more soluble in the oil than in the aqueous portion of the proposed emulsion; adding the chosen surfactant to the oil phase to form a clear solution; adding the resulting mixture to an aqueous solution containing a second surfactant which is more soluble in the water than in the oil; and then agitating. Rosano specifically teaches that the two surfactants required in the practice of his method must be different. It is important that the two surfactants have different solubility properties.

Rosano claims two methods for making microemulsions of polydiorganosiloxane and water, both of which have a step of dissolving the polydiorganosiloxane in trichlorotrifluoroethane, and then adding the first surfactant to the resulting solution. No polymerization of the polydiorganosiloxane fluid is taught by Rosano, and his example of a polydiorganosiloxane, water, microemulsion has a high, more than 3 to 1 surfactant-to-oil ratio, and low polydiorganosiloxane content of less that 4% in the final microemulsion. Rosano's method has the limitations of typical mechanical methods.

Standard opaque emulsions of polydiorganosiloxane are well known in the prior art. Specific art pertinent to this application is disclosed in U.S. Pat. No. 2,891,920 issued to Hyde et al., Jun. 23, 1959. Hyde teaches a method of combining a polysiloxane precursor (such as a cyclopolysiloxane, a hydroxy end-blocked siloxane oligomer, a dialkoxydialkylsilane, or a trialkoxyalkylsilane), surfactant, polymerization catalyst, and water to form a mixture, and heating the mixture while agitating to form an emulsion of the resulting high molecular weight siloxane and water. Hyde teaches that strong mineral acids and strong bases are catalysts for polymerizing cyclopolysiloxane into linear polysiloxane in an emulsion polymerization process that yields stable, standard, aqueous emulsions.

U.S. Pat. No. 3,294,725 issued to Findley et al. teaches the use of various sulfonic acids as catalysts for the emulsion polymerization of cyclopolysiloxanes, siloxane oligomers, and monofunctional and trifunctional silanes such as methyltrimethoxysilane and dimethyldimethoxysilane. Findley teaches that aliphatically substituted benzenesulfonic acids, aliphatically substituted naphthalenesulfonic acids, aliphatic sulfonic acids, silylalkylsulfonic acids and aliphatically substituted diphenyl ether sulfonic acids act as polymerization catalysts for the emulsion polymerization of cyclopolysiloxanes and also act to stabilize the resulting standard emulsions of linear polysiloxanes by acting as surface active agents when the aliphatic portion of the acid is between 6 and 18 carbon atoms long.

The methods described in Hyde and Findley using cyclopolydiorganosiloxanes as starting materials give stable aqueous emulsions of polydiorganosiloxanes. Hyde teaches that fine particle sizes can be obtained by allowing greater degrees of polymerization to occur, but no examples are given which show clear microemulsions.

One of the objects of the present invention is to provide a method for making clear stable aqueous microemulsions of polydiorganosiloxane and water. Another object of this invention is to provide a method that is capable of making clear, stable aqueous microemulsions of polydiorganosiloxane which have surfactant to polydiorganosiloxane ratios of less than one.

Another object of the present invention is to provide a method for making clear, stable aqueous microemulsions which have average droplet sizes less than 0.15 micron.

Another object of the invention is to provide a method for making clear, stable aqueous microemulsions of polydialkylsiloxane which have high polydiorganosiloxane contents in the range of 10% to 35% by weight, and mean number molecular weights of the polydiorganosiloxane materials greater than 20,000.

SUMMARY OF THE INVENTION

This invention is a novel method for making stable aqueous microemulsions of high molecular weight polydiorganosiloxanes which comprises sequentially adding at an effective rate a standard emulsion comprised of polydiorganosiloxane precursor, surfactant, and water (a precursor emulsion) to a polymerization catalyst medium while mixing to form a clear, stable aqueous microemulsion of polydiorganosiloxane. The rate of addition of the aqueous emulsion of precursor is related to the temperature of the catalyst solution, in that higher temperatures allow faster rates of addition.

Anionic, cationic, or nonionic surfactants can be used to stabilize the precursor emulsion and the microemulsion produced by the invention. Nonionic surfactants with hydrophilic-lipophilic balances (HLB) of between about 10 and about 20 are preferred in stabilizing the emulsions of polydiorganosiloxane precursor since the nonionic surfactants are not polymerization catalysts. The use of nonionic surfactants with HLBs less than 10 results in hazy microemulsions due to the limited solubility of the surfactant, whereas, nonionic surfactants with higher HLBs give larger average droplet size microemulsions.

Catalysts used in typical emulsion polymerization synthesis of polydiorganosiloxane are useful in the practice of the invention.

Clear microemulsions are produced using the invention method which have average droplet sizes less than about 0.15 micron and polydiorganosiloxane contents of up to about 35% by weight. The polydiorganosiloxane materials can by polydialkysiloxanes, polydiorganosiloxanes where the organic groups are nonalkyl, or mixtures thereof. The polydiorganosiloxanes are of the general formula:

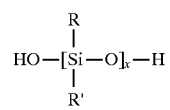

where R denotes methyl, and R' denotes methyl, ethyl, propyl, phenyl, or vinyl.

DETAILED DESCRIPTION OF THE INVENTION

It has been found that adding a standard polydiorganosiloxane precursor emulsion at a specifically defined rate to a polymerization medium comprised of an effective amount of polymerization catalyst, water, and surfactant while mixing surprisingly results in the formation of a microemulsion of polydiorganosiloxane which is stable with time and which has average droplet sizes less that 0.15 micron.

Microemulsion droplet sizes are variously defined in the chemical art with an upper limit on the droplet size typically being placed somewhere between 0.10 and 0.15 micron to distinguish microemulsions from opaque standard emulsions. In general, microemulsions can also be defined by their appearance: microemulsions are transparent, or translucent, and do not display the opalescence of standard emulsions. While microemulsions with average droplet sizes between 0.10 and 0.15 micron display the properties of microemulsions, microemulsions with average droplet sizes less than 0.10 micron are preferred for their even greater clarity and stability.

The polymerization reaction employed in the invention involves opening cyclopolysiloxane rings using anionic or cationic catalysts in the presence of water. Anions and cations act as polymerization catalysts for these reactions by opening the cyclopolysiloxane rings to form linear siloxane oligomers with terminal hydroxy groups. The oligomers react with other oligomers through condensation reactions to form polydiorganosiloxane. Surfactants are used to stabilize the polydiorganosiloxane in the form of small sized droplets.

Polydiorganosiloxane precursors which can be used in the practice of the invention include the cyclic siloxanes which are relatively insoluble in water and which can be polymerized using emulsion polymerization techniques. The preferred cyclic siloxanes are of the general formula:

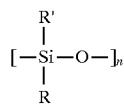

where R and R' denote methyl, ethyl, propyl, vinyl, allyl, or phenyl; n is 3, 4, 5, or 6. The cyclic precursors can be pure species such as octamethylcyclotetrasiloxane, hexamethylcyclotrisiloxane, decamethylcyclopentasiloxane, tetramethyltetravinylcyclotetrasiloxane, tetramethyltetraphenylcyclotetrasiloxane and the like. Mixture of the species can also be used. For instance, a mixture of cyclopolydimethylsiloxanes with 3, 4, and 5 siloxane units could be used.

Preferably, the major portion of the precursor material is comprised of cyclic siloxanes, however, a minor portion (10 mole percent or less) of other siloxane precursors can be added to the cyclic precursors. These other precursors must by hydrolyzable. For example, organofunctional polydiorganosiloxane precursors can be used in relatively minor portions with the cyclic precursors to impart organofunctionality to the polydiorganosiloxanes produced by the invention method. The precursors which can be added to the cyclic precursors in minor portions include hydroxyl-endblocked diorganosiloxane oligomers with degrees of polymerization between about 10 and 40; and hydrolyzable silanes, including organofunctional silanes such as N-(2-aminoethyl)-3-amino-propyltrimethyoxysilane, trimethoxyvinylsilane, tris-(2-methoxyethoxy) vinylsilane, and 3-chloropropyltrimethoxysilane.

The polymerization medium used in the invention comprises water, an effective amount of surfactant to stabilize the polydiorganosiloxane droplets formed therein, and an effective amount of catalyst to polymerize the polydiorganosiloxane precursor. The amount of catalyst required to catalyze the polymerization of the precursor is between 0.01 and 40 weight percent of the polydiorganosiloxane precursor depending upon the catalyst employed. Mineral acids and alkali metal hydroxides can be used in minute concentrations, while catalysts that also function as surfactants such as dodecylbenzenesulfonic acid are required in concentrations in the upper portion of the range.

All known condensation polymerization catalysts used in the emulsion polymerization of cyclopolysiloxanes are useful in practicing the present invention method. Such catalysts include cationic and anionic species. The cationic catalysts include strong bases, for example quaternary ammonium hydroxides of the formula $R_4NOH$ such as tallowtrimethylammonium hydroxide (the chloride salt is known as Arquad® T sold by Armak), and metal hydroxides such as sodium hydroxide. The art reveals a large number of cationic catalysts that work to condense cyclic siloxanes in the presence of water which are useful in practicing the invention.

Anionic condensation catalysts include strong mineral acids, aliphatically substituted benzenesulfonic acids and aliphatic sulfonic acids, but are not limited to such catalysts. Any catalyst that polymerizes cyclopolysiloxanes in the presence of water can be used to practice the invention.

A wide range of types of surfactants can be used to practice the invention. Anionic, nonionic, and cationic surfactants are useful in stabilizing the emulsion of the polydiorganosiloxane precursor, and the polydiorganosiloxane microemulsion formed by the emulsion polymerization.

Anionic surfactants useful in the practice of the invention include the sulfonic acids and their salts described in Findley, U.S. Pat. No. 3,294,725, particularly, dodecylbenzenesulfonic acid and its salts. Other anionic surfactants known to be useful in emulsion polymerizations which produce polysiloxanes are also useful in the practice of the present invention.

Preferred cationic surfactants used in the process are those cationic surfactants known in the art to be useful in emulsion polymerization of polysiloxanes, and include tetraalkylsubstituted ammonium chlorides with 1 or 2 alkyl chains between 6 and 18 carbon atoms in length. The cationic surfactants taught by Hyde, U.S. Pat. No. 2,891,920, are incorporated by reference.

Nonionic surfactants useful in the method of the invention include nonionic surfactants with hydrophilic-lipophilic balances (HLB) between 10 and 20. Specifically, the following nonionic surfactants were found useful in the invention method; 2,6,8-trimethyl-4-nonyloxypolyethylene oxyethanol (6 EO) (sold as Tergitol® TMN-6 by Union Carbide); 2,6,8-trimethyl-4-nonlyoxypolyethylene oxyethanol (10EO) (sold as Tergitol® TMN-10 by Union Carbide); alkyleneoxypolyethyleneoxyethanol (C 11-15 secondary alkyl, 9 EO) (sold by Union Carbide as Tergitol® 15-S-9); alkyleneoxypolyethylenoxyehtanol (C 11-15 secondary alkyl, 15 EO) (sold as Tergitol® 15-S-15 by Union Carbide); and, octylphenoxy polyethoxy ethanol (40 EO) (sold by Rohm and Haas as Triton® X405).

When nonionic surfactants with HLB values less than 10 were employed to stabilize the precursor emulsion the resulting microemulsions produced by the invention method were hazy due to the limited solubility of the nonionic surfactant. Addition of a high HLB value nonionic surfactant made the microemulsion clear. Thus, low HLB value nonionic surfactants can be employed in the invention if a high HLB value surfactant is added after the polymerization step.

A certain minimum ratio of surfactant to polydiorganosiloxane is required in the final microemulsion to stabilize the polydiorganosiloxane droplets. A surfactant to polydiorganosiloxane weight ratio of at least about 0.15 is required to form clear, stable aqueous microemulsions. Ratios greater that 0.15 produce smaller droplet sizes. Larger quantities of surfactant can be used to stabilize the microemulsions, even as much as five times the the amount of polydiorganosiloxane by weight, however, generally it is preferable to minimize the amount of surfactant used. The method by which the surfactant is supplied to the final microemulsion is not limited to any specific method. Preferably, the surfactant is present in sufficient quantities in the polymerization medium prior to the addition of the precursor emulsion. However, the surfactant could be present in the precursor emulsion in sufficient quantities to stabilize the microemulsion produced in the polymerization medium by the addition of the precursor emulsion. Alternatively, the surfactant could be supplied to the polymerization medium concurrent with the addition of the precursor medium.

When nonionic surfactants are used to stabilize the precursor emulsion smaller average droplet sizes are obtained in the microemulsion than when an equivalent amount of anionic or cationic surfactant is used to stabilize the precursor emulsion. For instance, a microemulsion made by the method of the invention, where an anionic catalyst was used in the polymerization medium and dodecylbenzenesulfonic acid (DBSA) was used as as the surfactant in the precursor emulsion, had an average droplet size of 0.045 micron. A microemulsion made by the same method, except that the nonionic surfactant Tergitol® TMN1O was used to stabilize the precursor emulsion, had an average droplet size of 0.030 micron.

Nonionic surfactants do not catalyze the polymerization of polydiorganosiloxane precursor used in the invention. Even at room temperature, the nonsalt forms of anionic and cationic surfactants catalyze the polymerization of these materials so that extended storage of precursor emulsions containing anionic or cationic surfactants results in the premature polymerization of the precursor and formation of standard cloudy emulsions of polydiorganosiloxane. While the invention can be practiced using anionic and cationic surfactants to stabilize the precursor emulsion, the use of nonionic surfactants is preferred.

The total polydiorganosiloxane content of the clear microemulsions which can be produced by the method of the present application ranges from 10 to about 35 weight percent. Lower polydiorganosiloxane content emulsions can be prepared, but the higher content microemulsions are generally preferred. The polydiorganosiloxane contents of the microemulsions made by the invention are significantly higher than those achieved by mechanical means.

It is believed that the emulsion addition method of the invention achieves the advantageous results because the method maintains a low concentration of unreacted polydiorganosiloxane precursor droplets in the polymerization medium. Theoretically, polymerization is initiated at the surface of the unreacted polydiorganosiloxane precursor droplets. Once the cyclic precursor molecule is opened, the resulting reactive oligomer is more soluble in the aqueous phase than the oil phase, and migrates to the aqueous phase where it is more likely to react in the aqueous phase with other reactive oligomers. As the concentration of reactive oligomers in the aqueous phase increases micelle formation occurs. The micelle forms by association of the reactive oligomer and the surfactant molecules. Polymerization on the surface of the particles rather than polydiorganosiloxane precursor droplets is favored by maintaining low concentrations of unreacted polydiorganosiloxane precursor droplets in the polymerization medium.

In order to form stable aqueous microemulsions, it is important to keep the concentration of unreacted polydiorganosiloxane precursor droplets low, and to provide a means by which the unreacted droplets can be reacted, solubilized, and dispersed into the aqueous phase of the catalyst solution quickly. These twin goals are accomplished by slowly adding a standard precursor emulsion to a heated polymerization medium. The polydiorganosiloxane precursor droplets provide relatively high surface area to volume ratios. This high ratio provides more polymerization initiation sites, and increases the area available for solubilization and dispersion of the reactive molecules. The slow addition rate of the precursor emulsion insures lower polydiorganosiloxane droplet concentrations. This proposed mechanism is not intended to limit the scope of the invention.

The temperature of the polymerization medium, the rate of polymerization, and the rate of addition of the precursor emulsion to the polymerization medium are interrelated in the practice of the invention to produce clear microemulsions. Higher rates of polymerization allow faster rates of addition of the precursor emulsion. Elevating the temperature of the polymerization medium increases the rate of polymerization, and allows the precursor to be added to the polymerization medium more quickly. Low polymerization medium temperatures require slower rates of addition.

The precursor emulsion should be added to the polymerization medium in a continuous fashion over a period of time. However, the addition can be accomplished by adding a series of small portions of the precursor emulsion to the polymerization medium as long as the serial additions maintain a low concentration of polydiorganosiloxane precursor droplets in the polymerization medium. The rate of addition can vary during the addition step.

In general, the slower the rate of addition of the precursor emulsion to the polymerization medium is, the smaller the resulting droplet size is in the resulting microemulsion. The maximum effective rate of addition for a given precursor, surfactant, and catalyst combination will be unique to that combination. The optimal rate of addition will also depend upon the desired average droplet size. Optimizing the addition rate can be accomplished by visually monitoring the appearance of the microemulsion formed.

Generally, microemulsions with average droplet sizes less than 0.15 micron are obtained when polymerization medium temperatures higher than room temperature were employed. For instance, the addition of 150 grams of precursor emulsion, comprised of 40% precursor, to 150 grams of polymerization medium over about two hours at more than 50° C. temperature produced a clear, stable microemulsion with an average droplet size of less than 0.10 micron. Temperatures greater than 100° C. can be employed in closed systems to allow higher rates of addition of the polydiorganosiloxane precursor emulsion to the polymerization medium.

The degree of polymerization of the polydiorganosiloxane in the microemulsion can be controlled by monitoring the polydiorganosiloxane in the polymerization medium, and neutralizing the catalyst when the desired degree of polymerization has been achieved.

EXAMPLES

The examples which follow illustrate the invention, or show the results of methods not within the scope of the invention for purposes of comparison. These illustrations and comparisons are not intended to delineate the scope of the invention.

The average droplet sizes reported were determined using the cumulant method of Cummins as described in "Photon Correlation and Light Beating Spectroscopy", H. Z. Cummins and E. R. Pite, Plenum Press, New York. Spherical droplet shapes were assumed in the calculations.

The average molecular weight of the polydiorganosiloxane was measured by gel permeation chromatography (GPC) after breaking the microemulsion and separating the phases. All polydiorganosiloxanes in the final microemulsions had number average molecular weights of at least 20,000, and weight average molecular weights of at least 50,000. Some of the microemulsions achieved these molecular weights before the polymerization was complete and the final droplet size had been achieved. All of the microemulsions produced by the invention method were clear; labels could be read through one centimeter samples produced by the method of the invention.

All of the examples illustrating the invention produced microemulsions which upon neutralization of the catalyst were stable in appearance and average droplet size over several months. The "final" average droplet size reported is the average droplet size of the microemulsion which did not change over 3 successive 12 hour intervals prior to neutralization of the catalyst. Average droplet size was stable over a period of weeks after the "final" droplet size was achieved. Average droplet size is reported in microns.

EXAMPLE 1

This example illustrates a typical method of addition used in U.S. Pat. No. 3,294,725 with the levels of dodecylbenzenesulfonic acid (DBSA), octamethylcyclotetrasiloxane, and the temperatures of reaction which are used in other examples in this application. 200 g of octamethyltetrasiloxane, 80 g of DBSA, and 300 g of water were homogenized twice at 6,000 p.s.i., and then heated to 85° C. After one hour the mixture was no longer pourable. The gel became more viscous upon further heating.

EXAMPLE 2

This example demonstrates the importance of adding the polydiorganosiloxane precursor as an aqueous emulsion. 50 g of octamethylcyclotetrasiloxane were slowly added at a constant rate to an aqueous solution comprised of 20 g DBSA, and 150 g of water at 85° C. while constantly stirring, over a one hour period, and resulted in a bimodal mixture of droplets of less than 0.12 micron size, and a large portion of macroscopic polydiorganosiloxane droplets. After 2 days the large droplets flocculated, separated, and formed a separate polydiorganosiloxane layer.

A polymerization medium comprised of 0.15 g of DBSA, and 6.85 g of water was made and heated to 50° C. temperature. 3.0 g of dimethyldimethoxysilane were slowly added dropwise to the mixing catalyst solution. The mixture was stirred for ten hours at 50° C. temperature and yielded a cloudy mixture. Labels could not be read through a one centimeter sample of the mixture.

EXAMPLE 3

This example illustrates the invention method using DBSA as a surfactant, and as a polymerization catalyst for octamethylcyclotetrasiloxane.

Precursor Emulsion A was prepared by homogenizing a mixture comprised of 40 g of octamethylcyclotetrasiloxane, 3 g of dodecylbenzenesulfonic acid (DBSA), and 57 g of water. A polymerization medium of 13 g of DBSA and 87 g water was heated to 85° C. Emulsion A was sequentially added at a rate of 1 g per minute to the polymerization medium over 1.67 hours while mixing to form a clear microemulsion.

Samples of the clear microemulsion were taken after the addition of precursor Emulsion A was completed. The catalyst was neutralized using a dilute NaOH solution and average droplet size and molecular weight were measured. Average droplet sizes were stable, and ranged from 0.030 micron at 0 hours after the addition was completed, to 0.045 micron 4 hours after the addition was completed. No change in average droplet size, or appearance of the microemulsion was observed in the neutralized samples.

The molecular weight of the polydiorganosiloxane of the final sample was measured. The polydiorganosiloxane had a number average molecular weight of 42,000, and a weight average molecular weight of 125,000.

EXAMPLE 4

This example demonstrates the invention using lower concentrations of the surfactant/catalyst, DBSA, in the polymerization medium.

The same method of adding the precursor emulsion was used as in Example 3. 100 g of the precursor Emulsion A were added to a polymerization medium comprised of 13.5 g DBSA and 130.5 g water while mixing at 85° C. over a 1.67 hours. The addition was done at a continuous, steady rate of about 1 g per minute. Samples from the stirred mixture were removed, the polymerization catalyst was neutralized with dilute NaOH, and average droplet size was measured. Average droplet sizes ranged from 0.072 to 0.091 micron for samples taken 0 to 4 hours after the addition was completed. Average droplet sizes were stable after neutralization of the catalyst.

TABLE 1

Effect of Surfactant to Polydiorganosiloxane Wt. Ratio on Droplet size

| Example | A, % Surfactant | B, % Organo-Siloxane | A/B | Average Droplet Size at | | |
|---|---|---|---|---|---|---|
| | | | | 0.0 hour | 2.0 hour | Final |
| 3 | 8.0 | 20.0 | .40 | 0.036 | 0.045 | 0.045 |
| 4 | 6.0 | 20.0 | .30 | 0.082 | 0.091 | 0.091 |

EXAMPLE 5

This example illustrates the results of a "typical emulsion polymerization." It demonstrates the important of the rate of addition of the precursor emulsion to the polymerization medium, and also demonstrates the effect of solution temperature on the resulting average droplet size of the microemulsion.

100 g of precursor Emulsion A were poured into 100 g of the DBSA/water polymerization medium, as used in Example 3, at room temperature. This mixture was stirred, heated to 85° C., and polymerization was allowed to proceed for 3 hours. The resulting average droplet size ranged from 0.143 micron at 0 hours to 0.134 micron at 3 hours. The final average droplet size was 0.153 micron which was obtained 20 hours after the addition was completed.

The procedure was repeated twice, once at 55° C., and once at room temperature. At 55° C. the average droplet size ranged from 0.210 micron at 0 hours, to 0.139 micron at 23.5 hours. The average droplet sizes of the microemulsions made at room temperature ranged from 0.162 micron after 2 days of polymerization to 0.131 after 9 days of polymerization. The results are summarized in Table 2.

TABLE 2

Comparison of Emulsion Addition to Standard Polymerization

| Example | Temperature of Reaction | Average Droplet Size at | | | | |
|---|---|---|---|---|---|---|
| | | 0 hour | 1 hour | 2 hours | Final | 48 h |
| 3 | 85° C. | 0.030 | — | 0.045 | 0.045 | — |
| 5 | 85° C. | 0.143 | 0.124 | 0.126 | 0.153 | — |
| 5a | 55° C. | 0.210 | 0.190 | 0.160 | 0.139 | — |
| 5b | room temp. | — | — | — | 0.131 | 0.162 |

All of the microemulsions in this table had surfactant to polydiorganosiloxane weight ratios of 0.40 and used DBSA as the polymerization catalyst. The addition of the precursor emulsion was over a 1.67 hour period in Example 3. In Examples 5, 5a, and 5b the precursor emulsion was poured directly into the catalyst solution, and then heated to the indicated temperature. The approximate three-fold reduction in droplet size of Example 3 vs. Example 5 shows the beneficial result of sequentially adding the precursor emulsion to the polymerization medium.

EXAMPLE 6

This example demonstrates the effect that the polymerization medium temperature has on the average droplet size in the microemulsion. The precursor Emulsion A, the polymerization medium, and the rate of addition were the same as in Example 3. However, the temperature of the polymerization medium was 70° C. rather than 85° C. as in Example 3, and the time over which the the precursor emulsion was added to the polymerization medium was 2.1 hours rather than 1.67 hours. Droplet sizes in the microemulsion were 0.086 micron 1.5 hours after addition, and 0.11 micron 20 after addition.

The procedure was repeated with a polymerization medium temperature of 55° C. The average resulting droplet sizes were 0.10 micron 1.5 hours after addition, and 0.11 micron after 20 hours. The final average droplet size of 0.11 micron was obtained about 1 day after the addition step was completed. Results are reported in Table 3.

TABLE 3

Effect of Polymerization Medium Temperature on Droplet Size

| | | Droplet Size at | | | | | |
|---|---|---|---|---|---|---|---|
| Time | Temp. | 0.0 h | 1.5 h | 2.0 h | 3.3 h | 4.0 h | Final |
| 1.67 | 85° | 0.030 | — | 0.036 | — | 0.045 | 0.045 |
| 2.10 | 70° | 0.083 | 0.086 | — | 0.084 | — | 0.115 |
| 2.10 | 55° | 0.146 | 0.104 | — | 0.104 | — | 0.111 |

The surfactant to polydiorganosiloxane weight ratio was 0.40 for all samples in the table.

EXAMPLE 7

This example demonstrates that high solids content microemulsions could be made by the invention method.

The same materials and methods were used as in Example 3, however, the precursor emulsion comprised 86.5 g of water, 60 g of octamethylcyclotetrasiloxane, and 4.5 g of DBSA. The polymerization medium comprised 70.5 g of water and 19.5 g DBSA. The high polydiorganosiloxane content (25 wt %), clear microemulsion had average droplet sizes of 0.045 micron after the addition of precursor emulsion was completed. Average droplet size was 0.049 micron 3.5 hours after addition. The final average droplet size was obtained one day after the emulsion addition had been completed was 0.048 micron.

A higher polydiorganosiloxane content microemulsion was made. 250 g of precursor emulsion comprising of 142.5 g water, 100 g octamethyltetrasiloxane, and 7.5 g DBSA were sequentially added at a continuous and constant rate of 1.25 g/minute to a polymerization medium comprised of 35.5 g DBSA, and 50.5 g water, at 85° C. over two hours. The mixture was stirred constantly during the addition. Droplet sizes ranged from 0.096 micron immediately after adding the precursor emulsion to 0.103 micron one day after the addition. The final clear microemulsion was pourable, although viscous. The total polydiorganosiloxane content of the final clear microemulsion was 30 wt %.

TABLE 4

The Effect of Total Polydiorganosiloxane Contents on Droplet Size

| | % | Droplet Size at | | | | | |
|---|---|---|---|---|---|---|---|
| Example | Si | 0 hr. | 1.0 hr. | 2.3 | 3.5 | 4.0 | Final |
| 3 | 20 | 0.030 | — | — | — | 0.045 | 0.045 |
| 7 | 25 | 0.045 | 0.044 | 0.047 | 0.049 | — | 0.048 |
| 7 | 30 | 0.096 | 0.096 | 0.104 | 0.099 | — | 0.103 |

All the microemulsions in the table had surfactant to polydiorganosiloxane ratios of 0.40 by weight.

EXAMPLE 8 a) Clear microemulsions were obtained using a cationic surfactant rather than the anionic surfactant used in the previous examples. A precursor emulsion comprised of 240 g of water, 240 g of cyclosiloxane precursor, and 66 g of tallowtrimethylammonium chloride (Arquad® T27W) was made. 125 g of this precursor emulsion were slowly added over a two hour period to a polymerization medium at 85° C. comprised of 60 g Arquad® T27W, 65 g water and 11 g of a dilute NaOH solution.

The polymerization was continued for 37 hours while the mixture was stirred. Samples were removed periodically, and the catalyst was neutralized with acid. Average droplet sizes were 0.028 micron immediately after addition and 0.066 micron about four hours after addition. The final droplet size of 0.12 micron was obtained 33 hours after the emulsion addition step was completed. The final number average molecular weight of the polydiorganosiloxane in the droplets was greater than 32,000.

b) 3.2 g of the 20% NaOH catalyst were used rather than 11 g as in 8a. The average droplet size was 0.035 micron immediately after addition, and 0.065 micron after ten hours. The final stable droplet size of the unneutralized sample was 0.133 micron which was obtained 1 day after the addition of the precursor emulsion was completed.

TABLE 5

Comparative Results Using Anionic and Cationic Surfactants

| Precursor | | Droplet Size at | | | | |
|---|---|---|---|---|---|---|
| Surfactant | Example | 0 hours | 1.5 | 3.5 | 9 | Final |
| Arquad ® T27W | 8a | 0.028 | 0.037 | 0.049 | 0.066 | 0.140 |
| Arquad ® T27W | 8b | 0.022 | 0.035 | 0.047 | 0.065 | 0.133 |
| DBSA | 3 | 0.033 | — | 0.045 | — | 0.045 |

All microemulsion in this table had 8 wt % surfactant concentration, and 20 wt % polydiorganosiloxane concentration. The surfactant concentration in the precursor emulsion was 3 wt %.

EXAMPLE 9

This example illustrates that the method of the invention can be used employing a variety of nonionic surfactants to stabilize the precursor emulsion.

a) A precursor emulsion comprised of 200 g octamethylcyclotetrasiloxane, 15 g 2,6,8 trimethyl-4-nonyloxypolyethylene oxyethanaol (Tergitol® TMN6), and 285 g water was made. 150 g of this precursor emulsion were added over two hours at a steady and continuous rate to a polymerization medium comprised of 19.5 g DBSA, and 130.5 g water while mixing at 85° C. Droplet sizes ranged from 0.039 micron after the addition of the precursor emulsion was completed to 0.043 micron 1 day after the addition was completed. The microemulsions appeared slightly cloudy, but cleared upon dilution with distilled water which suggests that the haziness was due to the insolubility of the nonionic surfactant.

Adding the surfactant octylphenoxypolyethoxy ethanol (40 EO) (Triton® X405) to the unneutralized final sample produced microemulsions with an average droplet size of 0.033 micron.

b) 2,6,8-trimethyl-4-nonyloxypolyethylene oxyethanol (10 EO) (Tergitol® TMN10) was used rather than Tergitol® TMN6. Average droplet sizes ranged from 0.029 micron immediately after addition, to 0.030 micron four hours after the addition was completed.

c) Alkyleneoxypolyethylene-oxyethanol (C 11-15 secondary alcohol, 9 EO) (Tergitol® 15-S-9)was used instead of Tergitol® TMN6. Average droplet size ranged from 0.031 micron immediately after addition of precursor emulsion, to 0.033 micron to 0.033 micron four hours after addition.

d) Alkyleneoxypolyethylene-oxyethanol (C 11-15 secondary alcohol, 15 EO) (Tergitol® 15-S-15) was used as the nonionic surfactant rather than Tergitol® TMN6. Average droplet sizes measured 0.032 micron immediately after completion of addition, and 0.032 micron four hours after. Final average droplet size was 0.034 micron.

TABLE 6

Nonionic Surfactants Used in Precursor Emulsion

| | Add. Time | Droplet Size at | | | | | Triton ® |
|---|---|---|---|---|---|---|---|
| | | 0.0 hr. | 1.5 hr. | 3.0 hr. | 4.0 hr. | Final | |
| Example 9a | 2.0 | 0.039 | 0.043 | 0.042 | 0.042 | 0.043 | 0.033 |
| Example 9b | 2.0 | 0.028 | 0.029 | 0.030 | 0.029 | 0.026 | 0.029 |
| Example 9c | 1.5 | 0.031 | 0.032 | 0.032 | 0.033 | 0.034 | — |
| Example 9d | 1.5 | 0.031 | 0.032 | 0.032 | 0.033 | 0.034 | — |

All examples used 3.0 wt % of the nonionic surfactant to stabilize the precursor emulsion. The polydiorganosiloxane content in the microemulsions was 20 wt %, and the total surfactant concentration in the microemulsions was 8 wt %.

EXAMPLE 10

This example illustrates the effect of the total surfactant concentration on the average droplet size of the microemulsions.

a) A precursor emulsion comprised of 200 g octamethylcyclotetrasiloxane, 10 g surfactant (Tergitol® TMN10), and 290 g water was made. 150 g of this precursor emulsion were slowly added over a two hour period to a polymerization medium comprised of 15 g of DBSA, and 135 g of water while stirring at 85° C. Initially, the resulting mixture was viscous. After several hours the average droplet size in the microemulsion was about 0.03 micron.

b) A lower level of DBSA catalyst/surfactant was employed; 10 g of DBSA were present in the polymerization medium rather than 15 g. Initially after the addition was complete, the stirred mixture was gel-like. Upon further polymerization, the viscosity dropped and the microemulsion became clear. Droplet size ranged from 0.10 micron immediately after addition to 0.082 micron 4 hours after addition. The microemulsion appeared hazy due to the limited solubility of the nonionic surfactant. This haziness was removed by the addition of Triton® X405 to the microemulsion.

c) A precursor emulsion was made comprising 200 g cyclopolysiloxane, 290 g water, and 10 g of octylphenoxypolyethoxy ethanol (40 EO) (Triton® X405). This surfactant has an HLB value of about 18. 150 g of this precursor emulsion were slowly added at 85° C. to a polymerization medium comprised of 15 g DBSA, and 135 g water while mixing. The addition of the precursor emulsion took 2 hours to complete. Polymerization was allowed to proceed for four hours. Samples taken from the mixture had average droplet sizes ranging from 0.031 to 0.036 micron. After the clear microemulsion had been left overnight the average droplet size was 0.035 micron.

d) This example illustrates that higher catalyst concentrations are required when high HLB value nonionic surfactants are used to stabilize the precursor emulsion. A lower concentration of DBSA was used in the polymerization medium than in Example 10c, 10 g rather than 15 g. Droplet sizes of neutralized samples ranged from 0.12 to 0.13 micron. The final droplet size of the microemulsion was 0.13 micron which was obtained 1 day after the addition.

TABLE 7

Effects of Low Concentrations of Nonionic and DBSA Surfactant

| | | Droplet Size at | | | |
|---|---|---|---|---|---|
| Example | % DBSA | 0 hr. | 1 hr. | 3 hr. | Final |
| 10a | 5.0 | 0.091 | 0.030 | 0.034 | 0.035 |
| 10b | 3.0 | 0.233 | 0.100 | 0.090 | 0.082 |
| 10c | 5.0 | 0.031 | 0.030 | 0.031 | 0.036 |
| 10d | 3.0 | 0.120 | 0.121 | 0.125 | 0.129 |

All of the microemulsion contained 1% nonionic surfactant by weight in the final microemulsion, the indicated wt % of DBSA, and 20 wt % polydiorganosiloxane. It can be seen that very high quality microemulsions can be made with as little as 4 wt % surfactant, and surfactant to polydiorganosiloxane ratios of about 0.20.

EXAMPLE 11

This example illustrates the invention method using a mixture of cyclopolymethylvinylsiloxane and octamethylcyclotetrasiloxane as the polydiorganosiloxane precursor. A precursor emulsion comprised of 15 g dodecylbenzenesulfonic acid, 100 g of tetramethyltetravinylcyclotetrasiloxane, 100 g of octamethylcyclotetrasiloxane, and 285 g of water was made. 28.5 g of this precursor emulsion were slowly added dropwise to a mixing polymerization medium comprised of 6.04 g of dodecylbenzenesulfonic acid, and 22.5 g of water, at 85° C. temperature. A clear microemulsion was formed. After 8.5 hours the average droplet size was 0.042 micron.

A mixture of comprising 3.7g of N-(2-aminoethyl)-3-amino-propyltrimethyoxysilane and 200 g of octamethylcyclotetrasiloxane was made. This mixture was emulsified with 256 g of water and 40 g of the cationic surfactant tallowtrimethylammonium chloride. 25 g of this emulsion were added dropwise over a one hour period to 25 g of a heated catalyst solution while stirring. The catalyst solution initially comprised 9 g tallowtrimethylammoniumchloride, 15 g water, and 0.05 g sodium hydroxide. The catalyst solution was heated to 85° C. and maintained at that temperature during the precursor emulsion addition.

The average droplet size of the polydiorganosiloxane droplets in the microemulsion was 0.089 micron after the polymerization had been allowed to run for nine hours. After twenty hours of reaction the average droplet size was 0.075 micron. The microemulsion was clear; a label could be read through a one centimeter sample.

EXAMPLE 12

This example illustrates the method as taught in U.S. Pat. No. 3,294,725, example 1.

A solution of 150 grams of dimethylsiloxane cyclics, 5 grams of the sodium salt of dodecylbenzenesulfonic acid, 2 grams of dodecylbenzenesulfonic acid and 333 grams of water were placed in a reactor and, with vigorous stirring, heated to 80° C. and held at that temperature with continued stirring for 24 hours.

After 3 hours the product was a white emulsion having a particle size of 0.08 microns with a broad size distribution. There was 22% unemulsified oil on top which indicated that only a small portion of the cyclics had reacted.

After 24 hours the product was an opaque white emulsion having a particle size of 0.13 microns with a broad size distribution. There was 6% unemulsified oil on top. Percent non-volatile content measurement shows that 13% of the total silicone is cyclics.

EXAMPLE 13

This example illustrates the method as taught in U.S. Pat. No. 3,294,725, except using the same material and amounts as in Example 3.

A solution of 80 grams of dodecylbenzenesulfonic acid, 720 grams of water and 200 grams of dimethyl cyclic were homogenized twice at 6000 psi. The particle size was 0.18 microns and the solution appeared opaque white. The solution was placed in a flask; heated to 85° C. with stirring and reacted for 2 hours. The emulsion now had a particle size of 0.10 microns and appeared opaque, but very translucent, tan/white in color. There was no unemulsified oil on top.

By comparison, the emulsion produced in Example 3 produced a clear microemulsion having a particle size of 0.03 microns.

What is claimed is:

1. A method for making clear, stable, aqueous microemulsions of polydiorganosiloxane which comprises: sequentially adding a precursor emulsion comprised of cyclopolydiorganosiloxane, surfactant, and water to a polymerization medium comprised of water and an effective amount of a polymerization catalyst while mixing wherein the rate of addition of the precursor emulsion is effective to form a clear, stable microemulsion which has polydiorganosiloxane droplets of less than 0.15 micron average size, and which contains a surfactant to polydiorganosiloxane weight ratio of 0.15 to 5.

2. A method according to claim 1 wherein the cyclopolydiorganosiloxane is represented by the general formula

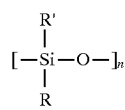

where R denotes methyl, and R' denotes methyl, ethyl, propyl, vinyl, allyl, or phenyl, and n is 3, 4, 5, or 6.

3. A method according to claim 2 wherein R' denotes methyl.

4. A method according to claim 3 wherein temperature of the polymerization medium is at least 50° C. during the addition of the precursor emulsion, and the polydiorganosiloxane droplets are less than 0.10 micron in size.

5. A method according to claim 4 wherein the surfactant used in the precursor emulsion is an anionic, a cationic, or a nonionic surfactant.

6. A method according to claim 5 wherein the surfactant used in the precursor emulsion is a nonionic surfactant with a hydrophilic-lipophilic balance between about 10 and about 20.

7. A method according to claim 6, wherein the surfactant used in the precursor emulsion is a nonionic surfactant chosen from the group of surfactants consisting of 2,6,8-trimethyl-4-nonyloxypolyethylene oxyethanol (6 EO), 2,6,8-trimethyl-4-nonyloxypolyethylene oxyethanol (10EO), alkylene-oxypolyethyleneoxyethanol (C 11-15 secondary alkyl, 9 EO), alkylene-oxypolyethyleneoxyethanol (C 11-15 secondary alkyl, 15 EO), octylphenoxy polyethoxy ethanol (40 EO), and polyethyleneoxide-iso-octylphenylether.

8. A method according to claim 5 wherein the surfactant used in the precursor emulsion is an anionic surfactant chosen from the group consisting of aliphatically substituted benzenesulfonic acids and their salts, aliphatically substituted naphthalenesulfonic acids and their salts, aliphatically substituted sulfonic acids and their salts, silylakylsulfonic acids and their salts, or aliphatically substituted diphenylethersulfonic acids and their salts, with aliphatic substituents containing carbon chains between 6 and 18 carbon atoms in length.

9. A method according to claim 4 wherein the catalyst used in the polymerization medium is selected from the group consisting of mineral acids, alkali metal hydroxides, sulfonic acids, and quaternary ammonium hydroxides.

10. A method according to claim 9 wherein the catalyst used in the polymerization medium is an aliphatically substituted benzenesulfonic acid, an aliphatically substituted naphthalenesulfonic acid, an aliphatic sulfonic acid, a silylalkylsulfonic acid, or an aliphatically substituted diphenylethersulfonic acid, with aliphatic substituents containing carbon chains between 6 and 18 carbon atoms in length.

11. A method according to claim 9 where the catalyst used in the polymerization medium is a cationic catalyst of the tetraalkylammonium type where at least one alkyl group is between 6 and 18 carbon atoms long, and the other alkyl groups are between 1 and 18 carbon atoms long.

12. A method according to claim 1, wherein the polymerization of the cyclopolydiorganosiloxane is allowed to advance until the desired degree of polymerization is reached, and then the catalyst in the polymerization medium is neutralized.

13. A method according to claim 1 wherein the precursor emulsion further contains an organofunctional siloxane monomer selected from the group consisting of N-(2-aminoethyl)-3-aminopropyltrimethoxysilane, trimethoxyvinylsilane, tris-(2-methoxyethoxy)vinyl silane, and 3-chloropropyltrimethoxysilane.

14. A method according to claim 1 wherein the polymerization medium is between 50° C. and 100° C.

15. A method according to claim 1 wherein the polydiorganosiloxane droplets are less than 0.10 micron average size.

* * * * *